Aug. 28, 1962 D. H. SHOOK 3,051,362
BEAD BUILDING APPARATUS
Filed May 5, 1960 3 Sheets-Sheet 1

INVENTOR.
Donald H. Shook
BY
Atty.

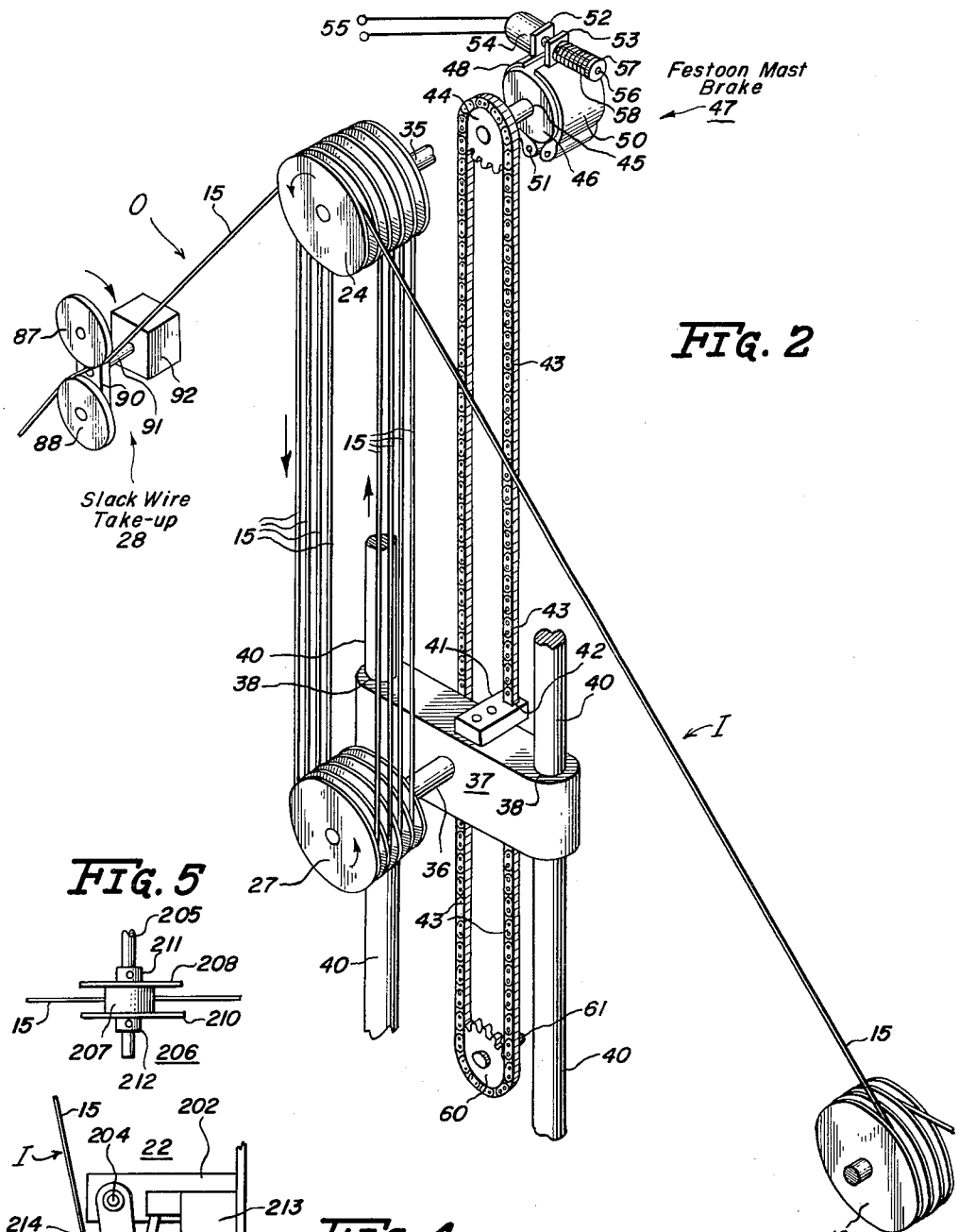

Aug. 28, 1962
D. H. SHOOK
3,051,362
BEAD BUILDING APPARATUS
Filed May 5, 1960
3 Sheets-Sheet 3
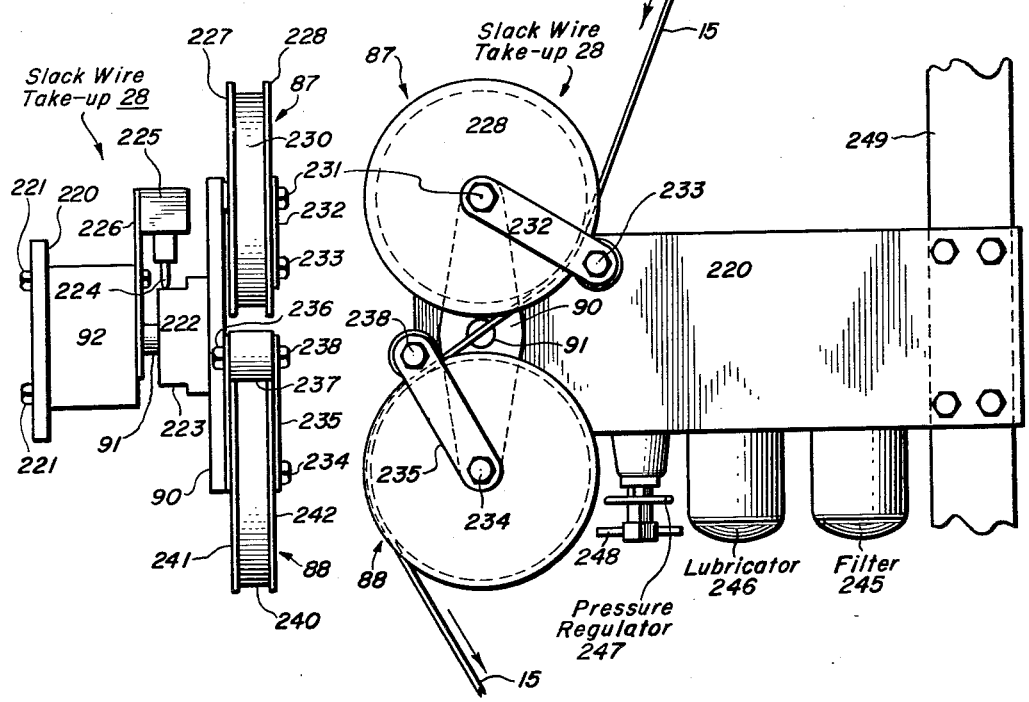
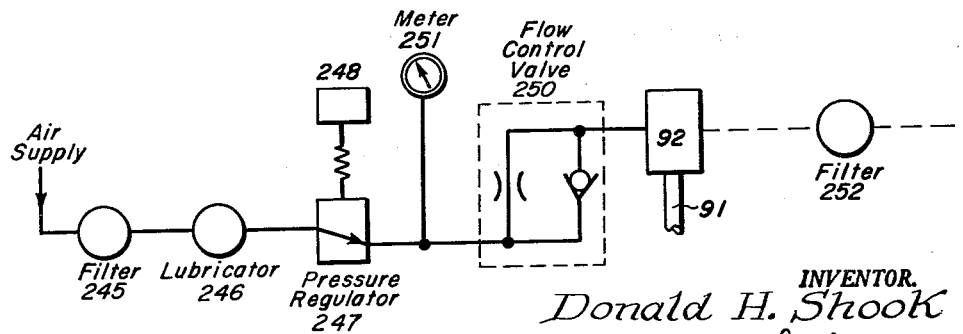
INVENTOR.
Donald H. Shook

United States Patent Office 3,051,362
Patented Aug. 28, 1962

3,051,362
BEAD BUILDING APPARATUS
Donald H. Shook, Niles, Mich., assignor to National-Standard Company, Niles, Mich., a corporation of Delaware
Filed May 5, 1960, Ser. No. 27,134
6 Claims. (Cl. 226—11)

This invention relates to tire bead building apparatus, and more particularly to apparatus in which tire bead material, in its travel from a source of supply to a winding drum on which the beads are formed, is maintained under control to prevent the development of slack therein, and, additionally, in the event of undesired slack, or breakage, or if the presence of a free end of the tire bead material occurs, operation of the apparatus is terminated.

It is common in the manufacture of tire beads to draw bead wire off a supply reel and through an extrusion head, in which the wire is coated with rubber, by means of a haul-off drum normally driven at a substantially constant speed. From the haul-off drum, the coated tire bead material extends, via an input path, to a storage device of variable capacity, such as a conventional festoon. The tire bead material is withdrawn from the festoon through an output path by the winding drum, driven in any suitable manner. The lead end of the tire bead material in the output path is fixed to the winding drum and upon rotation of the latter, a tire bead is formed thereon, after which rotation of the drum is terminated. The tire bead material is then severed at the winding drum, to complete the bead and provide for its removal from the winding drum, and afford a lead end for the next succeeding bead which is connected or fastened to the winding drum and the afore-discussed cycle repeated. In such cycle of operation, the storage device or festoon comes into play to provide for storage of tire bead material which is continuously being supplied to the storage device over the input path at a substantially constant rate by the haul-off drum, and accommodate the varying rate of travel of the tire bead material in the output path from the storage device to the winding drum due to the starting and stopping of the latter, and the acceleration and de-acceleration attendant to operation of the winding drum.

In the above typical apparatus of the prior art, difficulties are encountered due to the presence of slack in the tire bead material in the aforementioned input and output paths and, especially, in the output path due to the varying rate of travel of the tire bead material occasioned by the starting and stopping of the winding drum.

It is an object of my invention to provide tire bead building apparatus which avoids the difficulties of prior apparatus by providing slack wire take-up means for preventing the development of slack in the tire bead building material in its travel from the haul-off drum to the bead winding drum, and more particularly in the aforementioned output path between the storage device and the bead winding drum.

Also, in known bead building machines, the festoons, commonly employed as storage devices, include an upper set of sheaves independently mounted for rotation about a fixed common horizontal axis, and a lower set of sheaves, also independently mounted for rotation about a common axis, but in which the lower set of sheaves is movable vertically upwardly and downwardly relative to the upper set of sheaves to provide for the storage of tire bead material strung therebetween in the conventional manner. Should the tire bead material break between the supply reel and winding drum, or should the lead end in the output path be lost as by failure of proper attachment to the winding drum, or should the supply reel become exhausted, the lower set of sheaves of the festoon will drop suddenly entailing snarling of the tire bead material and necessitating a time consuming stringing up operation of the apparatus to again set it in operation.

It is a further object of my invention to avoid the aforementioned disadvantage by providing brake means operative to prevent vertical downward movement of the lower set of sheaves of the wire storage device or festoon upon the occurrence of any of the aforementioned conditions.

It is a further object of my invention to provide means, which conveniently may be associated with the aforementioned slack wire take-up means, for effecting actuation of the brake means for the lower set of sheaves of the festoon should the tire bead material in the output path break or the lead end be lost.

A further object of my invention is to provide sensor means disposed in the aforementioned input path operative primarily to affect actuation of the brake means for the lower set of sheaves should the tire bead material in the input path break or be exhausted from the supply reel.

It is a further object of my invention to provide slack wire take-up means and sensor means which are prevented from effecting application of the brake means for the lower set of sheaves in the absence of slack in the tire bead material between the haul-off drum and winding drum, but should undesirable slack, or breakage, or loss of an end of the tire bead material occur, then either or both of said means operate to apply the brake means for the lower set of sheaves of the festoon.

It is a further object of my invention to provide an apparatus as last related in which, upon application of the brake means for the lower set of sheaves of the festoon, the drive means for the haul-off drum is de-energized to prevent the feeding of tire bead material from the supply to the festoon over the aforementioned input path.

The above and other objects and advantages of my invention will appear from the following detailed description of a preferred embodiment of my invention.

Now in order to acquaint those skilled in the art with the manner of constructing and operating an apparatus in accordance with my present invention, I shall describe in connection with the accompanying drawings, a preferred embodiment of my invention.

In the drawings:

FIGURE 2 is a perspective view of a portion of the bead building apparatus showing in greater detail certain of the elements depicted generally in FIGURE 1;

FIGURE 4 is a side elevational view of sensor means incorporated in the input path of the tire bead material in the apparatus of FIGURE 1;

FIGURE 5 is a plan view of one of the components of the sensor means shown in FIGURE 4;

FIGURE 6 and 7 are side and front elevational views, respectively, of the slack-wire take-up means incorporated in the output path of the tire bead material in the apparatus of FIGURE 1; and FIGURE 8 is a diagrammatic showing of a suitable fluid pressure system for operating the slack-wire take-up means shown in detail in FIGURES 6 and 7.

*General System Description*

Tire bead-building apparatus including a festoon and control circuits for actuating and regulating various components of the system during the bead-building cycle, in which my present invention, by way of example may be incorporated, is disclosed and claimed in the copending application of Ernest U. Lang, entitled "Festoon Control System for Haul-Off Apparatus," filed January 21, 1960, Serial No. 3,774, owned by the assignee of the present invention, and to which reference may be had. It is to be understood, however, that my invention is not limited to incorporation in the bead building apparatus of the aforementioned co-pending application, but may be incorporated in any suitable apparatus typically composed of components along the lines hereinafter described in connection with FIGURES 1 and 2 of the drawings.

Figure 1:
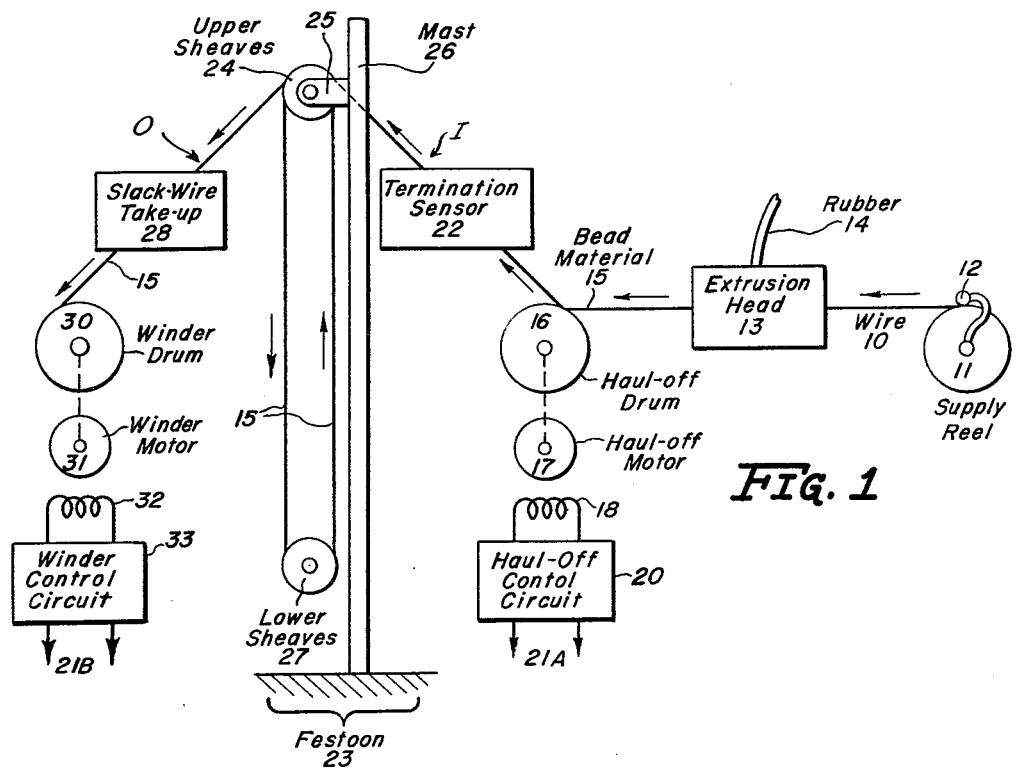
FIGURE 1 is a diagrammatic illustration of a bead building apparatus embodying my invention.

As shown in FIGURE 1, a strand of bead wire 10 is conventionally pulled off a supply reel 11 against the retarding force of the let-off finger 12, thence through extrusion head 13, to which a supply of rubber 14 is fed, and in which the wire 10 is coated with rubber to provide tire bead material, by a haul-off drum 16 driven at a substantially constant speed by a haul-off motor 17. The speed of the haul-off motor is preferably adjustable such as by varying the energization level of its field winding 18, shown coupled to haul-off control circuit 20, which in turn is energized over conductors 21A. Other control systems may be utilized for the drive motor, and the illustration in FIGURE 1 is only to be considered typical.

For purposes of orienting the components of my invention haul-off drum 16 can be considered as the input point of an input path I for tire bead material extending from the haul-off drum to festoon 23. An output path O for the tire bead material extends from the festoon 23 to an output point represented by winder drum 30. The festoon 23 may be of conventional construction and includes a set of upper sheaves 24 independently mounted on a common horizontal axis by means of an axle carried by a support 25 fixed to mast 26, and a lower set of sheaves 27, which are independently mounted for rotation on a common horizontal axis movable vertically upwardly and downwardly relative to the upper set as tire bead material is stored in or withdrawn from the festoon. The strand of tire bead material is withdrawn through the output path from festoon 23 by and to winder drum 30, on which the bead is formed. The winder drum is driven by a winder motor 31, having a field winding 32, the energization level of which is controlled by a winding control circuit 33, to which power is supplied over input conductors 21B.

In accordance with the present invention control sensor means 22 is positioned adjacent the aforementioned input path I and a slack-wire take-up control means 28 is disposed adjacent the output path O. The control means 22 and 28, and particularly the latter, are effective to prevent the occurrence of slack in the tire bead material in the input and output paths. Also, in the event of breakage of the tire bead material or should the lead end of the winder drum or the trailing end at the supply become free, the control means noted are effective to actuate brake means, hereinafter described, to prevent dropping of the set of lower sheaves and consequent disruption of the tire bead material from its appropriate path through the apparatus.

The speed of winder drum 30 in the building of each tire bead varies widely, so that slack may readily develop in output path O between the payout sheave of the upper set of sheaves 24 of the festoon and winder drum 30. To prevent such slack occurring, I provide a slack-wire take-up means 28 in the output path O, which is operative to maintain the tire bead material under tension and also to effect actuation of brake means to be described for preventing dropping of the lower set of sheaves 27, and de-energize haul-off motor 17. In that the speed of haul-off drum 16 is relatively constant, slack in tire bead material input path I between the haul-off drum and upper sheaves 24 does not occur to any significant extent. Accordingly, while control mechanism 22 may afford nominal prevention of slack it is essentially a termination sensor for detecting exhaustion of the supply of the bead material being fed from the haul-off drum 16 to the festoon 23 to provide a control action for preventing undue dropping of the lower set of sheaves 27 and to de-energize haul-off motor 17.

Upon reference to FIGURE 2, it will be seen that the upper set of sheaves 24 comprises five separate sheaves or pulleys rotatably connected by shaft 35, which is mounted in conventional fashion on a supporting member not illustrated. The lower set of sheaves 27 comprises four separate sheaves or pulleys, independently journalled on a shaft 36 mounted in a lower sheave support 37, which is of sufficient mass to normally urge the lower set of sheaves 27 downwardly to prevent the occurrence of slack in the strands of tire bead material 15 stored on the festoon between the upper and lower sets of sheaves. The lower sheave support 37 is guided for upward and downward vertical movement by cylindrical bores 38 therein which have sliding connection with spaced apart vertically extending cylindrical guide bars 40. Lateral and transverse movement of sheave support 37 is precluded by the mating engagement of the guide bars 40 and the cylindrical bores 38.

The lower sheave support 37 has a lug 41 suitably fixed at one end to the upper surface thereof and the other end of the lug is formed with an aperture 42 into which a chain 43 extends and is suitably secured. The chain 43 is trained over a lower sprocket wheel 60, journalled on a fixed shaft 61, and over an upper sprocket wheel 44 keyed to one end of a shaft 45, which at its opposite end carries a brake drum 46 of a festoon mast brake assembly indicated generally at 47. The festoon mast brake assembly 47 as will presently appear prevents the lower set of sheaves 27 from dropping upon the occurrence of any of the conditions already discussed.

The particular mast brake assembly 47 shown comprises a pair of brake shoes 48 and 50, each of which is formed with a bolt hole 51 at its lower end portion for receiving pivot bolts for mounting the brake shoes for movement toward and away from each other. Brake shoe 48 includes an upstanding flange 52, and a similar flange 53 extends upwardly from brake shoe 50. A solenoid 54, including a pair of energizing leads 55, is affixed to flange 52 and a solenoid plunger or actuator 56 extends from the solenoid through each of flanges 52 and 53, and carries a collar 57 at its outer free end. A bias spring 58 is disposed about plunger 56 to normally urge brake shoes 48 and 50 toward each other to engage the brake drum 46 and hold shaft 45 against rotation, and thereby through restraining movement of chain 43 to prevent downward movement of the set of lower sheaves 27. The festoon mast brake 47 thus includes means, namely spring 58, for normally holding the brake engaged, and other means, such as solenoid 54 and associated parts, which when energized releases the brake and permits vertical movement of the lower set of sheaves 27.

Figure 3:
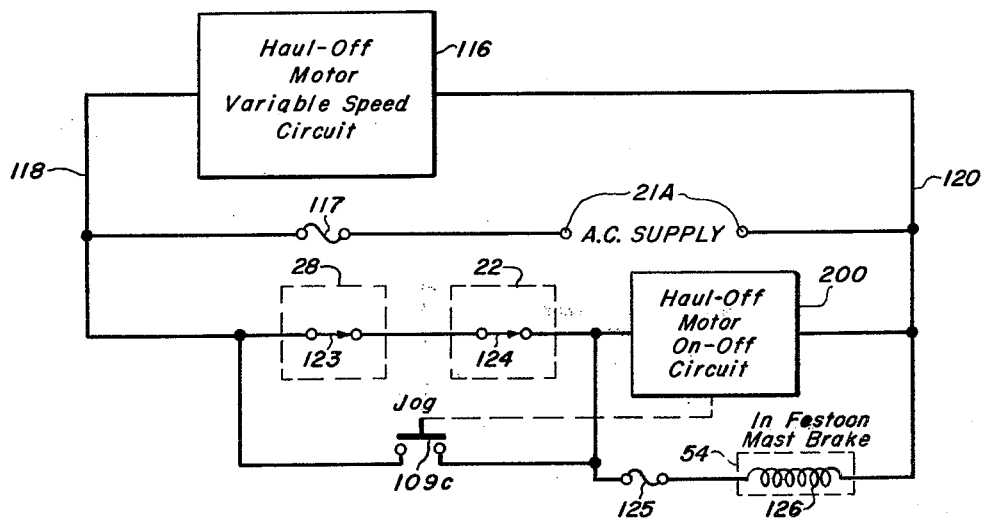
FIGURE 3 is a largely schematic control circuit diagram, partly in block form, for the apparatus shown generally in FIGURE 1.

Referring now to FIGURE 3, it will be seen that termination sensor control means 22 includes contacts 124 which are maintained in the closed position as long as tire bead material is traveling under appropriate tension in input path I from haul-off drum 16 to festoon 23. Somewhat similarly slack-wire take-up control means 28 comprises contacts 123, which are maintained in the closed position as long as undue slack does not exist in the tire bead material in output path O between festoon 23 and winder drum 30. In the circuit, energizing potential is supplied over terminals 21A to supply conductors 118 and 120. A circuit protecting fuse 117 is connected between supply conductor 118 and one of terminals 21A. As shown, the haul-off motor variable speed circuit 116 is connected between conductors 118 and 120. Also coupled between these conductors is a series circuit including the contacts 123 and 124, and a portion of the haul-off motor on-off circuit, designated at 200. So far as my present invention is concerned, it may be considered that block 200 represents the haul-off motor per se so that when contacts 123 and 124 are closed, the haul-off motor is energized.

As more particularly related in the aforementioned co-pending application, contacts 109c of a jog switch are coupled in parallel with contacts 123 and 124 of the two control means 22 and 28 for purposes of stringing the apparatus with tire bead material. Connected in parallel with the haul-off motor on-off circuit 200 is a series circuit comprising a fuse 125 and winding 126 of solenoid 54 of the aforedescribed festoon mast brake assembly 47. Thus, when contacts 123 and 124 are closed, the haul-off motor 17 is conditioned for operation and festoon mast brake solenoid 54 is energized to release the brake, thus permitting vertical ascent and descent of the lower set of sheaves 27.

With the apparatus in operation and contacts 123 and 124 closed, if there should be a break in or exhaustion of the supply of the material emerging from extrusion head 13, termination sensor control means 22 provides a first control action (opening of contacts 124) which interrupts the control circuit including contacts 123, contacts 124, and the parallel-connected combination of haul-off circuit 200 and winding 126 of the mast brake solenoid. With interruption of the control circuit, haul-off circuit 200 de-energizes haul-off motor 17 and mast brake 47 prevents rotation of upper sprocket wheel 44 to prevent the descent of the lower set of sheaves 27. In somewhat similar fashion the haul-off motor circuit 200 is interrupted and the mast brake solenoid 54 de-energized to hold the lower set of sheaves against downward vertical movement should an undue slack condition develop in the output path O or if the lead end of tire bead material is accidentally lost. The development of slack in output path O would be an extreme or unusual occurrence for, as will be explained, the slack wire take-up control means is highly effective to prevent that from happening.

*Termination Sensor Control Means*

As shown in FIGURES 4 and 5, termination sensor control means 22 is fixed to a frame or plate member 201 of the mast support structure, and includes a bracket 202, extending outwardly from plate 201. A pivot arm 203 is pivotally mounted at one end by a pivot bolt 204 to bracket 202. The other end of arm 203 supports a shaft 205 carrying a pulley 206 defined by a hub 207 and a pair of side flanges 208 and 210. Collars 211 and 212 are secured to shaft 205 adjacent flanges 208 and 210 to secure the pulley assembly thereon.

A microswitch 213 suitably fixed to plate 201, includes a conventional spring-biased arm 214, which at its outer end carries a follower 215.

When the bead building apparatus is in operation and a strand of tire bead material 15 is being fed under tension from haul-off drum 16 to upper sheaves 24 through input path I, the bias force applied through hub 207 to arm 214 by engagement of follower 215 bearing against arm 203 maintain contacts 124 closed. If the supply of tire bead material being fed from extrusion head 13 becomes exhausted, or if there is a break in the strand of tire bead material in the input path I between the haul-off drum 16 and the festoon 23, arm 203 is caused to pivot in a clockwise direction about pivot 204, permitting arm 214 to pivot in the same direction and thus open contacts 124 of the circuit of FIGURE 3. As explained hereinbefore, opening of contacts 124 effects both de-energization of the mast brake solenoid 54 and de-energization of haul-off motor 17. After the apparatus is conditioned for operation and a continuous strand of bead material in input path I between the haul-off drum and festoon 23 is again present, pivot arm 203 is returned by the strand to the position indicated in FIGURE 4 so that contacts 124 are reclosed and the control circuit is again completed. The arm 203 tends to rotate in a clockwise direction about its pivot 204 by reason of the weight of pulley 210, and by means of spring means (not shown) internally of switch 213 normally acting on arm 214 to engage roller 215 with arm 203 so that a slight biasing force is imposed on the tire bead material in input path I tending to minimize any nominal slack condition. However, as indicated, slack is not normally a problem in regard to input path I, but should it develop to an objectionable extent, contacts 124 will open.

*Slack-Wire Take-Up Control Means*

Upon reference now to FIGURES 6 and 7, the slack-wire take-up control means 28 there shown comprises a known air motor 92 secured by bolts 221 to a support plate 220, which in turn is bolted to a vertical mast member 249 adjacent output path O. The air motor 92 includes an output shaft 91, to which a cam actuator 222 and a support plate 90 are connected. The cam actuator includes a cam 223 for engaging a follower in the form of an actuating plunger 224 of a microswitch 225, the latter being carried by a support plate 226 bolted to the housing of the motor 92. The cam surface 223, upon a predetermined increment of rotation of actuator 222, is effective to displace plunger 224 and through tripping of microswitch 225 effect opening of switch 123 of the circuit shown in FIGURE 3.

The support plate 90, as shown, provides for the support of an upper pulley 87 and a lower pulley 88 lying in output path O and between which pulleys the tire bead material is trained.

Upper pulley 87 has end flanges 227 and 228 at either side of a hub 230, and is journalled on bolt 231 mounted in plate 90. The inner end of a generally downwardly extending guide bar 232 is mounted at the rotational axis of the pulley by bolt 231. A bolt assembly 233 at the outer end of guide bar 232 rotationally supports a roller between which and the hub 230 the strand 15 of tire bead material in the output path O is guided for retaining the strand in contact in a well known manner with the hub of the pulley.

In like manner lower pulley 88 is journalled on a bolt 234 mounted in plate 90 and which bolt also secures one end of a generally upwardly extending guide bar 235 at the rotational axis of the pulley. A bolt assembly 238 at the upper outer end of guide bar 235 supports a roller 237 outwardly of hub 240, and between which hub and roller the strand of tire bead material passes to retain it on the lower pulley. The roller and hub arrangements described prevent the tire bead material from becoming fouled as it passes between the pulleys should momentary slack condition occur in the operation of the apparatus.

The aforementioned air motor 92, as best shown in FIGURE 8, is connected in an air control circuit including a source of compressed air having connection with the inlet side of filter 245, the outlet of which connects with lubricator 246 and then to pressure regulator 247, which, as seen in FIGURE 8, includes a manual adjustment screw 248. It is standard practice to clean and lubricate the air so that components such as flow control valve 250 and air motor 92 will not clog or rust. The pressure regulator is adjusted to produce the proper operation of air motor 92, that is, to provide just sufficient tension on the strand 15 to prevent formation of slack. Further, air under pressure supplied to motor 92 must not be so great that the tension of the tire bead material is insufficient to overcome the torque applied to shaft 91 and prevent the return of pulleys 87 and 88 to their normal positions as shown in FIGURE 7.

A suitable assembly of filter 245, lubricator 246, and pressure regulator 247 is commercially available as an integrated unit, and is known as the Hannifin "Crown Combo" Style 2 combination air filter, lubricator and pressure regulator. A meter 251 is connected to the air line between the pressure regulator 247 and flow control valve 250 to provide the operator of the apparatus with a visual indication of the pressure changes effected by adjustment of manual pressure adjustment 248, and of the pressure in the line at this point.

The aforementioned flow control valve 250, connected between pressure regulator 247 and air motor 92 may, for example, be a Pneutrol 2500 flow control valve. The valve 250 allows air to pass freely from the supply line to the air motor 92, but restricts the return stroke of the shaft 91 of air motor 92 so that the shaft plate 90 and pulleys 87 and 88 do not slam back upon return to normal position. The air motor 92 has both input and output connections for permitting air to pass over a series of vanes in producing torque or turning movement on shaft 91. Since air under pressure is supplied to the input connection, a filter or breather 252 is connected to the output side of the Rotac to permit air to pass in and out as the air motor is displaced to prevent slack developing in output path O and then return to normal position. The filter 252 prevents the entry of dust or dirt which might damage or jam the air motor and prevent its satisfactory operation.

In lieu of the aforementioned Rotac air motor, another commercially available component known as the Logan air-hydraulic device may be used. It comprises air means for driving a rack meshing with a pinion on a shaft with arm attached for rotating support 90 and pulleys 87 and 88 to prevent slack as above described and includes a hydraulic dash-pot operative to provide cushioned return of the pulleys 87 and 88 to normal position.

As will be clear from FIGURES 1, 2, 6 and 7, the slack-wire take-up control means 28 is positioned relative to the generally downwardly and outwardly extending output path O between the upwardly located upper set of sheaves 24 and the laterally and downwardly positioned winding drum 30 to provide for training of the tire bead material to one side and below pulley 87 and above and to the opposite side of pulley 88. With this arrangement of the tire bead material rotation of support 90, as viewed in FIGURE 7, in a clockwise direction will prevent the creation of slack in output path O by effectively increasing the lineal length of the output path O. The motor means 92 is normally biased by delivery of air under pressure thereto as above described to rotate and prevent the creation of slack which would otherwise occur in the aforedescribed cycle of operation of the winding drum. Should slack develop beyond the capacity of pulleys 87 and 88 to accommodate, cam surface 223 on cam actuator 222 is rotated sufficiently to engage plunger 224, opening switch 123 in the circuit of FIGURE 3, which as before described interrupts the control circuit and de-energizes the haul-off motor 17 and the festoon mast brake solenoid to engage brake 47.

My invention thus provides means for preventing the occurrence of slack in the tire bead material as it passes through the apparatus, but should slack occur, or the tire material break, or there be a free or loose end, then brake means is actuated to prevent a set of sheaves from moving downwardly relative to the upper set of sheaves and de-energizing the haul-off motor avoiding the attendant problem of stringing up the apparatus before setting it again into operation.

While I have shown and described a preferred embodiment of my invention, it will be understood that various modifications and re-arrangements may be made therein without departing from the spirit and scope of my invention.

I claim:

1. Bead building apparatus comprising storage means having elements movable relative to each other for storing tire bead material of varying amount between said elements, means for delivering tire bead material to said storage means, means for withdrawing tire bead material from said storage means at variable rates of speed along an output path, brake means for said storage means for preventing movement of said elements with respect to each other, control means for preventing slack in a tire bead material in said output path, said control means including means for effecting application of said brake means upon breakage or existence of a free end of the tire bead material in said output path.

2. Bead building apparatus comprising storage means for tire bead material including relatively movable sets of sheaves between which the tire bead material extends to afford for the storage of tire bead material of varying amount by movement of said sets of sheaves toward and away from each other, drive means for delivering tire bead material to said storage means along an input path at a substantially constant rate of speed, means for withdrawing tire bead material from said storage means along an output path at varying rates of speed, control means in said output path for preventing slack in tire bead material in its movement in said output path, brake means associated with said sets of sheaves for preventing relative movement therebetween, said control means including means for effecting application of said brake means and termination of said drive means upon breakage or existence of a free end of the tire bead material in said output path.

3. In bead building apparatus including storage means for tire bead material having relatively movable sets of sheaves to afford for the storage of tire bead material of varying amounts therebetween by movement of said sheaves toward and away from each other, drive means for delivering tire bead material to said storage means along an input path at a substantially constant rate of speed, and means for withdrawing tire bead material from said storage means along an output path, the combination of control means including pulley means located in said output path and engaging the tire bead material, said control means including motor means for biasing said pulley means in a direction to maintain the tire bead material in said output path under tension to prevent the development of slack, brake means associated with said sets of sheaves for preventing relative movement therebetween, and said control means including means for effecting application of said brake means and termination of said drive means upon breakage or existence of a free end of tire bead material in said output path.

4. In bead building apparatus including storage means for tire bead material having relatively movable sets of sheaves to afford for the storage of tire bead material of varying amounts therebetween by movement of said sheaves toward and away from each other, drive means for delivering tire bead material to said storage means along an input path at a substantially constant rate of speed, and means for withdrawing tire bead material from said storage means along an output path, the combination of control means including pulley means located in said output path and engaging the tire bead material, said control means including motor means for biasing said pulley means in a direction to maintain the tire bead material in said output path under tension to prevent the development of slack, brake means associated with said sets of sheaves for preventing relative movement therebetween, and said control means including means for effecting application of said brake means and termination of said drive means upon breakage or existence of a free end of tire bead material in said output path, and second control means in said input path operative for applying said brake means upon breakage or existence of a free end of the tire bead material in said input path.

5. In bead building apparatus including a festoon having a fixed set of sheaves and a movable set of sheaves for storing tire bead material of varying amount therebetween by movement of the sets of sheaves toward and away from each other, brake means associated with said sets of sheaves for preventing relative movement therebetween, a haul-off drum driven by a haul-off motor for feeding tire bead material over an input path to said festoon, and a winding drum driven at varying speeds of rotation for withdrawing tire bead material over an output path from said festoon, the combination of control means comprising a shaft, pulley means carried by said shaft and engaging the tire bead material in said output path, motor means for biasing said shaft in a direction to effect tensioning of the tire bead material in said output path, and means for effecting application of said brake means and de-energization of said haul-off motor responsive to occurrence of a predetermined amount of slack in said output path.

6. In bead building apparatus including a festoon having a fixed set of sheaves and a movable set of sheaves for storing tire bead material of varying amount therebetween by movement of the sets of sheaves toward and away from each other, brake means associated with said sets of sheaves for preventing relative movement therebetween, a haul-off drum driven by a haul-off motor for feeding tire bead material over an input path to said festoon, and a winding drum driven at varying speeds of rotation for withdrawing tire bead material over an output path from said festoon, the combination of: a first control means comprising a shaft, pulley means carried by said shaft and engaging the tire bead material in said output path, motor means for biasing said shaft in a direction to effect tensioning of the tire bead material in said output path, and a first switch means positioned for actuation responsive to a preassigned angular displacement of said shaft, a second control means comprising a pivot arm, pulley means carried by said pivot arm and engaging the tire bead material in said input path, means for biasing said pivot arm to cause said pulley to engage said bead material to sense the presence thereof in said input path, and a second switch means positioned for actuation responsive to a preassigned angular displacement of said pivot arm, and a control circuit including said first and second switch means for effecting application of said brake means and de-energization of said haul-off motor responsive to occurrence of a predetermined amount of slack, a free end, or a break in the bead material in said input and output paths.

References Cited in the file of this patent
UNITED STATES PATENTS

| | | |
|---|---|---|
| 2,590,699 | Heyer | Mar. 25, 1952 |
| 2,603,428 | Newcombe | July 15, 1952 |
| 2,685,417 | Bartelson | Aug. 3, 1954 |
| 2,734,253 | Suggs | Feb. 14, 1956 |
| 2,760,734 | Hornberger | Aug. 28, 1956 |
| 2,771,984 | Ranney | Nov. 27, 1956 |
| 2,847,211 | Halley | Aug. 12, 1958 |